(12) United States Patent
Kanenari

(10) Patent No.: US 9,409,451 B2
(45) Date of Patent: Aug. 9, 2016

(54) TIRE INFORMATION OBTAINING DEVICE, TIRE CONDITION MONITORING SYSTEM, AND METHOD FOR RECOVERING PUNCTURE REPAIR LIQUID

(75) Inventor: Daisuke Kanenari, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 176 days.

(21) Appl. No.: 14/342,349

(22) PCT Filed: Aug. 29, 2012

(86) PCT No.: PCT/JP2012/005460
§ 371 (c)(1),
(2), (4) Date: Feb. 28, 2014

(87) PCT Pub. No.: WO2013/031220
PCT Pub. Date: Mar. 7, 2013

(65) Prior Publication Data
US 2014/0216147 A1    Aug. 7, 2014

(30) Foreign Application Priority Data

Sep. 2, 2011 (JP) ................................. 2011-191824

(51) Int. Cl.
*B60C 23/02* (2006.01)
*B60C 23/04* (2006.01)
(Continued)

(52) U.S. Cl.
CPC ................. *B60C 23/04* (2013.01); *B29C 73/02* (2013.01); *B60C 23/0494* (2013.01); *B60C 29/062* (2013.04); *B29C 73/166* (2013.01)

(58) Field of Classification Search
CPC .. B60C 23/0408; B60C 23/04; B60C 23/061; G01M 17/022
USPC ............... 73/146.5, 146.3, 146.4, 146.2, 146; 141/4
See application file for complete search history.

(56) References Cited

U.S. PATENT DOCUMENTS

2002/0046599 A1* 4/2002 Chuang ............... B60C 23/0494
73/146
2010/0328059 A1* 12/2010 Kanenari ............ B60C 23/0494
340/447

(Continued)

FOREIGN PATENT DOCUMENTS

DE            101 42 354        3/2002
DE      10 2010 030 506        12/2010
(Continued)

OTHER PUBLICATIONS

Kanenari WO 2011064991 Transmission device for transmitting information about tire condition and tire condition monitoring system.*

(Continued)

*Primary Examiner* — Lisa Caputo
*Assistant Examiner* — Nigel Plumb
(74) *Attorney, Agent, or Firm* — Thorpe North & Western

(57) ABSTRACT

A tire information obtaining device provided in a tire cavity region for obtaining tire information related to a condition of a tire includes: a sensor that detects the state of gas in the tire cavity region as the tire information; a valve; and a housing having an internal space for containing the sensor in a state of being compartmentalized from the tire cavity region, a ventilation hole for allowing communication between the internal space and the tire cavity region, and a communication hole connected to a cavity region side opening part of the valve at an end portion on the tire cavity region side and allowing communication between the cavity region side opening part and the tire cavity region.

19 Claims, 17 Drawing Sheets

(51) Int. Cl.
  *B29C 73/02* (2006.01)
  *B60C 29/06* (2006.01)
  *B29C 73/16* (2006.01)

(56) References Cited

U.S. PATENT DOCUMENTS

2012/0229266 A1  9/2012  Kanenari
2013/0126037 A1  5/2013  Kanenari et al.

FOREIGN PATENT DOCUMENTS

| | | |
|---|---|---|
| FR | 2 884 610 | 10/2006 |
| FR | 2884610 | 10/2006 |
| JP | 2002-144830 | 5/2002 |
| JP | 2007-331210 | 12/2007 |
| JP | 2008/001222 | 1/2008 |
| JP | 2008-001222 | 1/2008 |
| JP | 2011-005986 | 1/2011 |
| JP | 2011-111087 | 6/2011 |
| WO | WO 2011/064991 | 6/2011 |
| WO | WO 2011-064991 | 6/2011 |
| WO | WO 2011-086764 | 7/2011 |
| WO | WO 2011/086764 | 7/2011 |

OTHER PUBLICATIONS

International Search Report dated Nov. 27, 2012, 6 pages, Japan.

* cited by examiner

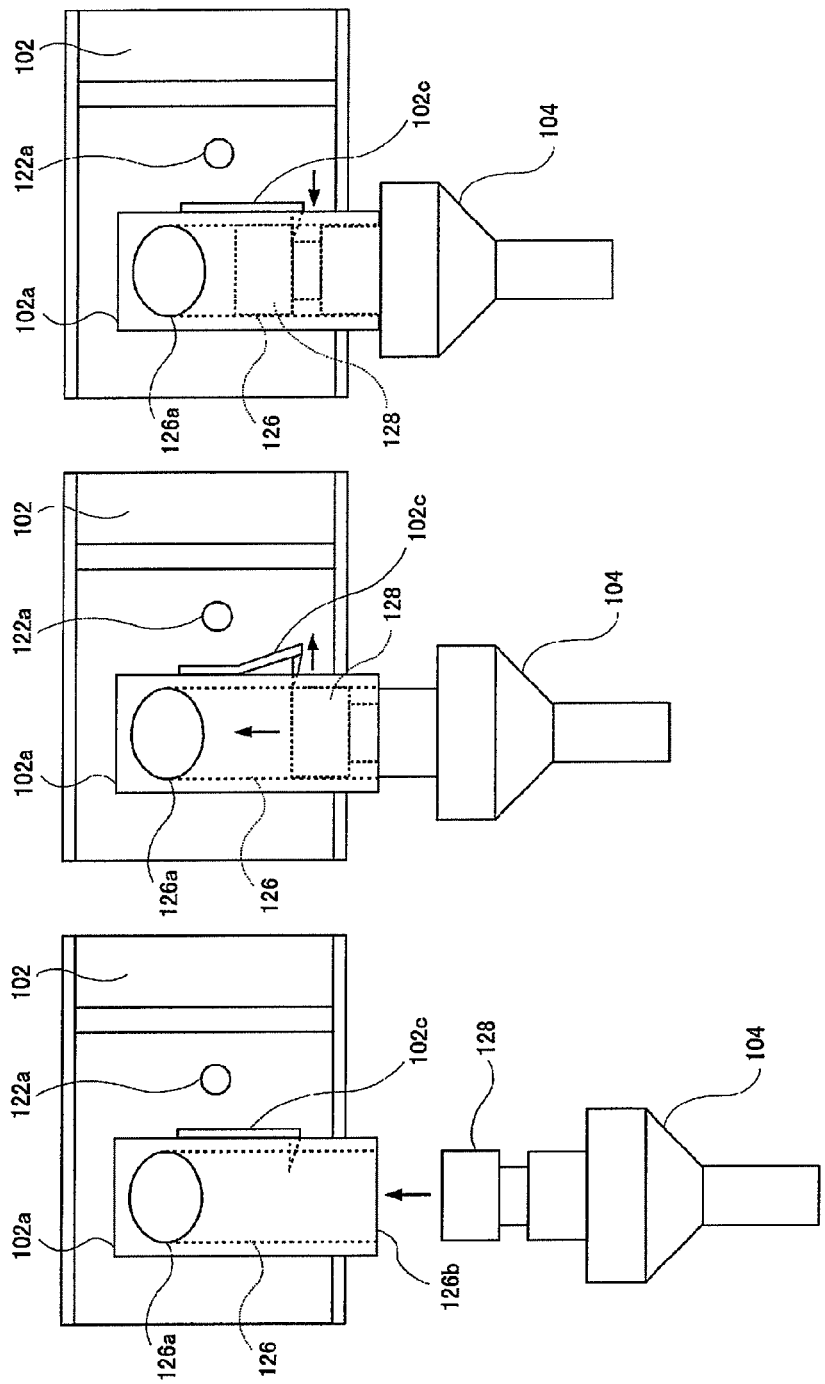

TIRE INFORMATION OBTAINING DEVICE, TIRE CONDITION MONITORING SYSTEM, AND METHOD FOR RECOVERING PUNCTURE REPAIR LIQUID

TECHNICAL FIELD

The present technology relates to a tire information obtaining device ("tire information device" or "obtaining device") that is used for obtaining tire information related to the state of a tire and that is provided inside a tire cavity region, a tire condition monitoring system, and a method for recovering puncture repair liquid.

BACKGROUND TECHNOLOGY

Conventionally, inspecting and managing air pressure of tires mounted on vehicles has been desirable from the perspectives of enhancing tire durability, wear resistance, fuel economy, riding comfort, and driving performance. Therefore, various systems for monitoring air pressure of tires have been proposed. Generally, in such a system, an obtaining device that obtains information about air pressure of tires mounted on a vehicle and transmits that information is provided in the tire cavity regions of each wheel, and a monitoring unit monitors the air pressure of the tires obtained by the obtaining device that obtains the air pressure information of the tires (see, for example, Japanese Unexamined Patent Application Publication No. 2008-1222).

The obtaining device described in Japanese Unexamined Patent Application Publication No. 2008-1222 has a tire pressure monitoring system (TPMS) valve that measures and transmits the air pressure in the tire cavity region, and an L-shaped air valve that penetrates the rim, and the TPMS valve and the L-shaped air valve are configured to allow connection therebetween. Ventilation is produced between the tire cavity region and the atmosphere outside of the tire due to air passages provided in both valves being connected when both valves are connected.

Puncture repair liquid to be injected inside the tire cavity region interposed between the tire and the rim is often used when a puncture occurs in a tire. Since the puncture repair liquid is in a liquid form, the puncture repair liquid adheres to the inner surface of the tire that faces the tire cavity region and may even adhere to the obtaining device provided in the tire cavity region when the puncture repair liquid is injected into the tire cavity region. In some cases, the puncture repair liquid solidifies and covers an opening provided in the obtaining device for sensing the air pressure, thus becoming a problem that adversely affects the measurement of the air pressure.

To resolve this problem, a tube may be inserted into the tire cavity region from the tire valve so that the puncture repair liquid inside the tire cavity region can be exhausted through the tube.

However, since the obtaining device in Japanese Unexamined Patent Application Publication No. 2008-1222 has an L-shaped air valve, it is difficult to insert the tube into the tire cavity region through the air valve. As a result, there is a concern that the puncture repair material may not be recovered.

Furthermore, since the obtaining device in Japanese Unexamined Patent Application Publication No. 2008-1222 is provided with a sensor unit for detecting the air pressure in the tire cavity region exposed in the vicinity of an opening part of an air passage formed on the surface of the TPMS valve facing the tire cavity region, there is a concern that the puncture repair liquid may adhere to the sensor unit when the puncture repair liquid is injected into the tire cavity region.

SUMMARY

The present technology provides an obtaining device, a tire condition monitoring system, and a method for recovering puncture repair liquid that are able to suitably obtain tire information such as tire air pressure information and the like even if a puncture of the tire has been repaired using puncture repair liquid and are able to easily recover the puncture repair liquid according to a new method different from the above conventional technology.

One aspect of the present technology is an obtaining device provided in a tire cavity region for obtaining tire information related to a condition of a tire.

The obtaining device includes: a sensor that detects a condition of gas filling the tire cavity region as tire information; a tire valve that ventilates the tire cavity region with the atmosphere outside of the tire; and a housing that includes an internal space for containing the sensor in a state of being compartmentalized from the tire cavity region, a ventilation hole that allows communication between the internal space and the tire cavity region, and a communication hole that is connected with an opening part at an end portion on the tire cavity region side of the tire valve and that allows communication between the opening part of the tire valve and the tire cavity region, the diameter of the communication hole and the inner diameter of the tire valve having a minimum value of not less than 2.5 mm, and the ventilation hole being provided at a position outside a range of less than 140° of the angle of view from a center position corresponding to the position of an opening of the communication hole with respect to a central direction aligned with the direction of extension of the communication hole from the opening of the communication hole at the end portion on the tire cavity region side.

The hole cross-sectional area of the communication hole is preferably greater than the hole cross-sectional area of the tire valve in a portion in which the inner diameter of the tire valve is the smallest.

Moreover, a step is provided that protrudes from the inner wall surface of an inner wall of the tire valve so that the hole cross-sectional area of the tire valve increases from the opening part toward an external opening part at an end portion of the tire valve on the tire exterior portion side, and the height of the step is preferably 1 mm or less.

Moreover, the direction of extension of the communication hole preferably faces the outer side in the tire radial direction at the opening of the end portion of the communication hole on the tire cavity region side, and the angle formed by the directions of extension of the communication hole at the openings at both end portions of the communication hole is preferably 25° or less.

Moreover, a detachable mechanism that allows the tire valve to be inserted into the communication hole and to be held in a removable manner, is preferably provided in the housing.

Another aspect of the present technology is a tire condition monitoring system.

The system includes an obtaining device, a reception device, and a monitoring part.

The obtaining device includes: a sensor that detects a condition of gas filling a tire cavity region as tire information; a transmitter that wirelessly transmits the tire information detected by the sensor; a tire valve that ventilates the tire cavity region with the atmosphere outside of the tire; and a housing that includes an internal space for containing the sensor in a state of being compartmentalized from the tire cavity region, a ventilation hole that allows communication between the internal space and the tire cavity region, and a communication hole that is connected with an opening part at an end portion on the tire cavity region side of the tire valve and that allows communication between the opening part of the tire valve and the tire cavity region, the diameter of the communication hole and the inner diameter of the tire valve having a minimum value of not less than 2.5 mm, and the ventilation hole being provided at a position outside a range of less than 140° of the angle of view from a center position corresponding to the position of the opening of the communication hole with respect to a central direction aligned with the direction of extension of the communication hole from the opening of the communication hole at the end portion on the tire cavity region side.

The reception device receives the tire information transmitted by the transmitter of the obtaining device; and the monitoring part determines the presence or absence of an abnormality of the tire on the basis of the tire information received by the reception device, and reports the determination results.

Still another aspect of the present technology is a method for recovering puncture repair liquid.

The method includes the steps of: removing a valve core of a tire valve of the obtaining device, from a tire in which the obtaining device is provided in a tire cavity region and in which a puncture repair liquid is injected into the tire cavity region; and inserting a tube through the tire valve of the obtaining device to reach the puncture repair liquid in the tire cavity region when air in the tire cavity region is exhausted to the outside of the tire through the tire valve.

The obtaining device, the tire condition monitoring system, and the method for recovering puncture repair liquid as described above are able to suitably obtain tire information such as tire air pressure information and the like even if a puncture of the tire has been repaired using puncture repair liquid and are able to easily recover the puncture repair liquid.

BRIEF DESCRIPTION OF THE DRAWINGS

FIGS. 17A to 17C describe other examples of methods for attaching the tire valve to the housing.

DETAILED DESCRIPTION

The following is a detailed description of the obtaining device, the tire condition monitoring system, and the method for recovering puncture repair liquid of the present technology.
(Outline of the Tire Condition Monitoring System)

Figure 1:
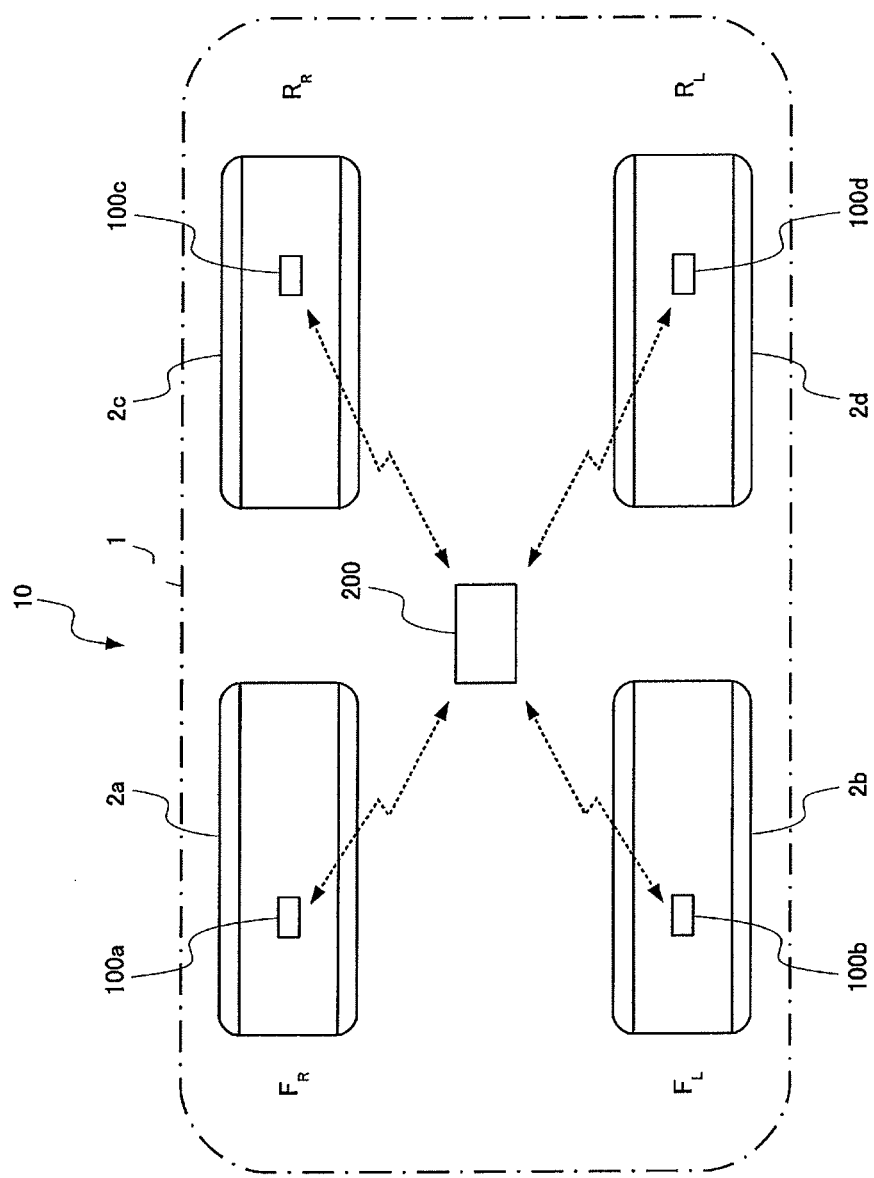
FIG. 1 is an overview of a tire air pressure monitoring system that is an embodiment of a tire condition monitoring system.

FIG. 1 is an overview of a tire condition monitoring system 10 that is an embodiment of a tire condition monitoring system.

The tire condition monitoring system 10 (hereinafter, referred to as system) is mounted on a vehicle 1. The system 10 has tire information obtaining devices (hereinafter, referred to as obtaining devices) 100a, 100b, 100c, and 100d provided in a tire cavity region of tires 2a, 2b, 2c, and 2d (when describing the tires 2a, 2b, 2c, and 2d together, the tires 2a, 2b, 2c, and 2d will be referred to collectively as tire 2), respectively, on the vehicle 1, and a monitoring device 200.

Each of the obtaining devices 1001, 100b, 100c, and 100d detects the condition of gas filling the tire cavity region enclosed by the tire 2 and a rim 3 (see FIG. 2) as tire information relating to the condition of the tire, and wirelessly transmits the tire information to the monitoring device 200. When describing all the obtaining devices 100a, 100b, 100c, and 100d together hereinafter, the obtaining devices 100a, 100b, 100c, and 100d will be referred to collectively as the obtaining device 100.
(Configuration of the Obtaining Device)

Figure 2:
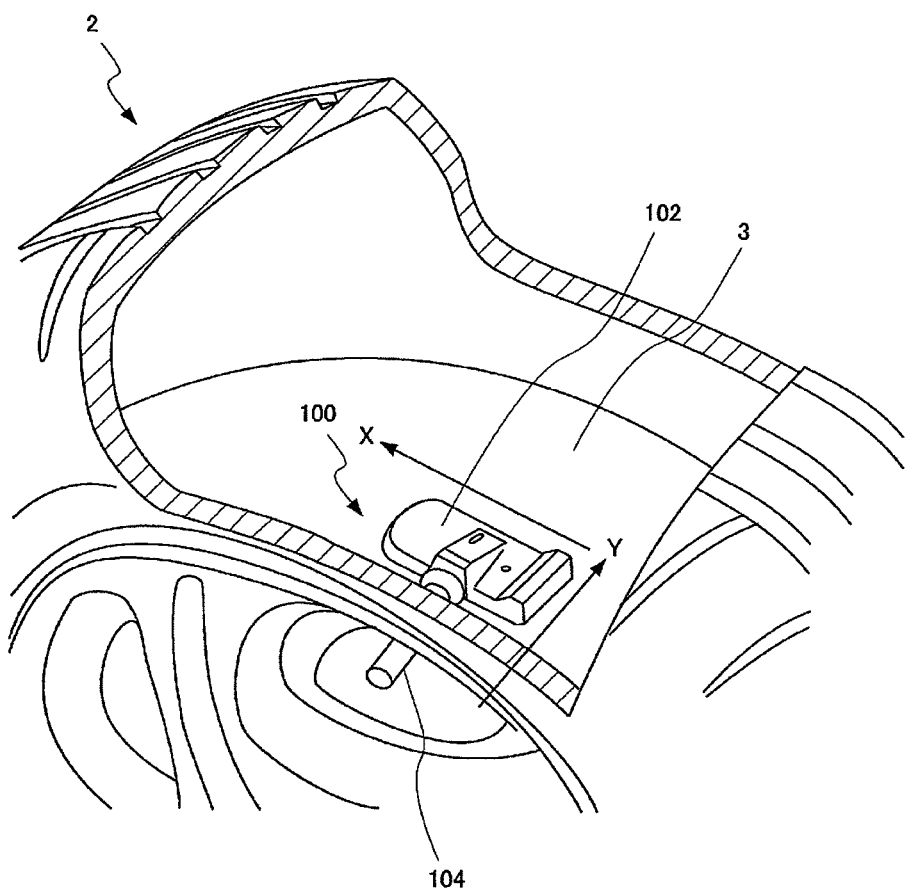
FIG. 2 describes an example of a method for fixing an obtaining device inside a tire cavity region.
Figure 3:
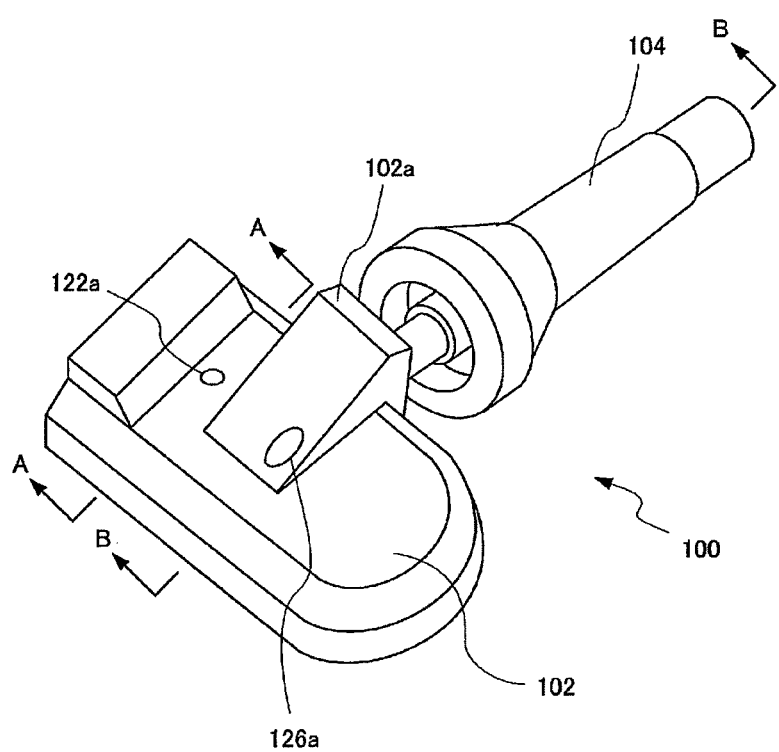
FIG. 3 is a perspective view of the entire obtaining device depicted in FIG. 2.

FIG. 2 describes an example of a method for fixing the obtaining device 100 on a tire. FIG. 3 is a perspective view of the entire obtaining device 100 illustrated in FIG. 2.

The obtaining device 100 has a housing 102 disposed inside the tire cavity region, and a tire valve 104 that ventilates the tire cavity region with the atmosphere outside of the tire 2. The housing 102 is formed in a substantially plate-like shape and is provided so as to extend in the tire circumferential direction (X-direction in FIG. 2). The tire valve 104 has a tubular shape that extends in the tire width direction (Y-direction in FIG. 2) and is provided so as to pass through, in the tire width direction, a through-hole (not illustrated) provided in the rim 3. That is, a first end in the direction of extension (Y-direction in FIG. 2) of the tire valve 104 is positioned in the tire cavity region. The housing 102 is disposed so as to be connected to the first end in the direction of extension of the tire valve 104 in the tire cavity region, and to be fixed inside the tire cavity region due to the tire valve 104 being mechanically fixed to the rim 3 as illustrated in FIG. 2.

Furthermore, the top surface, that is, the surface on the outer side in the tire radial direction, of the housing 102 is provided with a convex portion 102a (illustrated in FIG. 3) that projects upward, that is, toward the outer side in the tire radial direction.

The tire circumferential direction is the rolling direction of a tread portion, in other words, the rolling direction of the tire 2, when the tread portion of the tire 2 is rotated around a rotational axis of the tire. The tire radial direction is the direction extending radially from the tire rotational axis.

Figure 4:
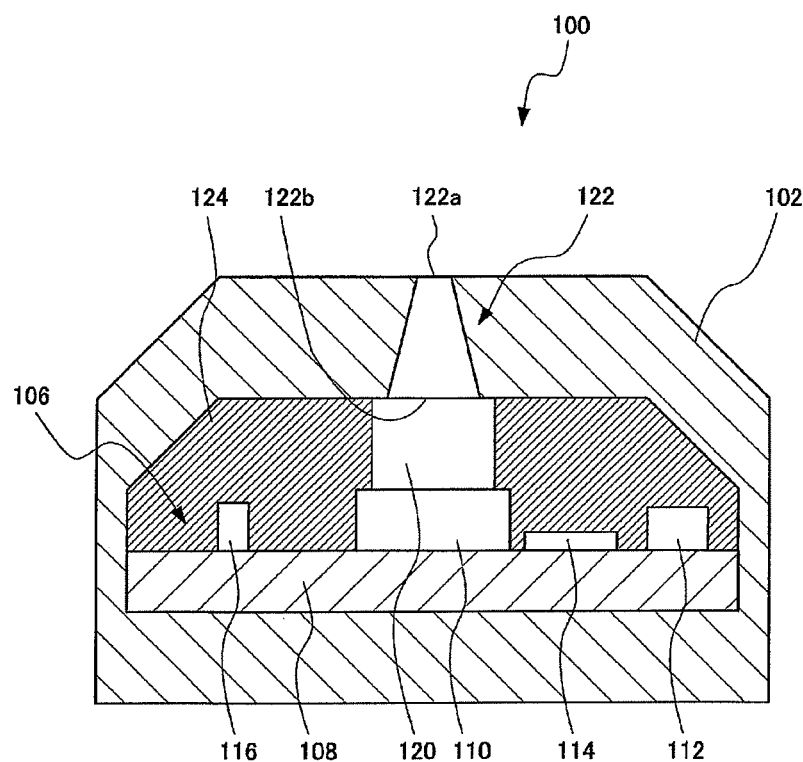
FIG. 4 is an arrow cross-sectional view of the obtaining device along line A-A in FIG. 3.

FIG. 4 is an arrow cross-sectional view of the housing 102 along the line A-A in FIG. 3. As illustrated in FIG. 4, the housing 102 has a circuit 106 provided inside the housing 102. The circuit 106 has a substrate 108, a sensor unit 110 provided on the substrate 108, a transmitter 112, a processing unit 114, a power supply unit 116, and an antenna 118 (illustrated in FIG. 8). An internal space 120 is provided inside the housing 102 for containing the circuit 106 in a state of being compartmentalized from the tire cavity region.

The sensor unit 110 includes a sensor that detects, as tire information, the condition of gas filling the tire cavity region. In this embodiment, the sensor unit 110 detects, as tire information, the air pressure of the gas filling the tire cavity region. The sensor unit 110 has a sensor surface for detecting air pressure, and the sensor surface faces the internal space 120.

A ventilation hole 122 that allows communication between the internal space 120 in the housing 102 and the tire cavity region is provided in the housing 102 so as to penetrate the wall of the housing 102. An outside opening part 122a of the ventilation hole 122 is provided in the surface of the housing 102 where the ventilation hole 122 faces the tire cavity region. That is, the outside opening part 122a is provided so as to open toward the outer side in the tire radial direction. Conversely, an inside opening part 122b of the ventilation hole 122 is provided in the surface of the housing 102 where the ventilation hole 122 faces the internal space 120.

As illustrated in FIG. 4, the cross-sectional area of the ventilation hole 122 increases from the outside opening part 122a toward the inside opening part 122b. That is, the inside opening part 122b of the ventilation hole 122 has a greater opening area than the outside opening part 122a. By forming the opening area of the inside opening part 122b greater than the opening area of the outside opening part 122a, capillary action is less likely to occur than in a conventional case in which the opening areas of the outside opening part and the inside opening part of a ventilation hole are the same. As a result, even if liquid such as the puncture repair liquid adheres to the outside opening part 122a, it becomes more difficult for the liquid such as the puncture repair liquid to flow into the ventilation hole 122 and further into the internal space 120.

The opening area of the outside opening part 122a of the ventilation hole 122 is, for example, not more than 0.4 mm². By making the opening area of the outside opening part 122a not more than 0.4 mm², liquid such as the tire puncture repair liquid is less likely to flow into the ventilation hole 122.

Moreover, making the opening area of the inside opening part 122b, for example, four times greater or more than the opening area of the outside opening part 122a is preferable from the point of view of preventing intrusion of the puncture repair liquid into the ventilation hole 122 and preventing the ventilation hole 122 from becoming covered by the puncture repair liquid.

The inside region covered by the wall of the housing 102 is filled with a sealing resin 124 as an internal member while maintaining the internal space 120. Specifically, the internal space 120 is compartmentalized from the tire cavity region by the wall surface of the housing 102 and by the inner wall of the internal member provided in the housing 102. The internal space 120 is narrower than the region inside covered by the wall of the housing 102. As illustrated in FIG. 4, the cross-section of the internal space 120 is enlarged from the inside opening part 122b of the ventilation hole 122.

The ventilation hole 122 is provided in the housing 102 as the only path that allows communication between the internal space 120 and the tire cavity region. The reason for this is that if, for example, a plurality of ventilation holes 122 were provided, liquid such as the puncture repair liquid may easily flow into the internal space 120 from the ventilation holes 122.

While at least one wall surface of the internal space 120 is made by the sealing resin 124, the internal member is not limited to the sealing resin 124. A resin formed in a certain shape may be disposed as the internal member.

Figure 5:
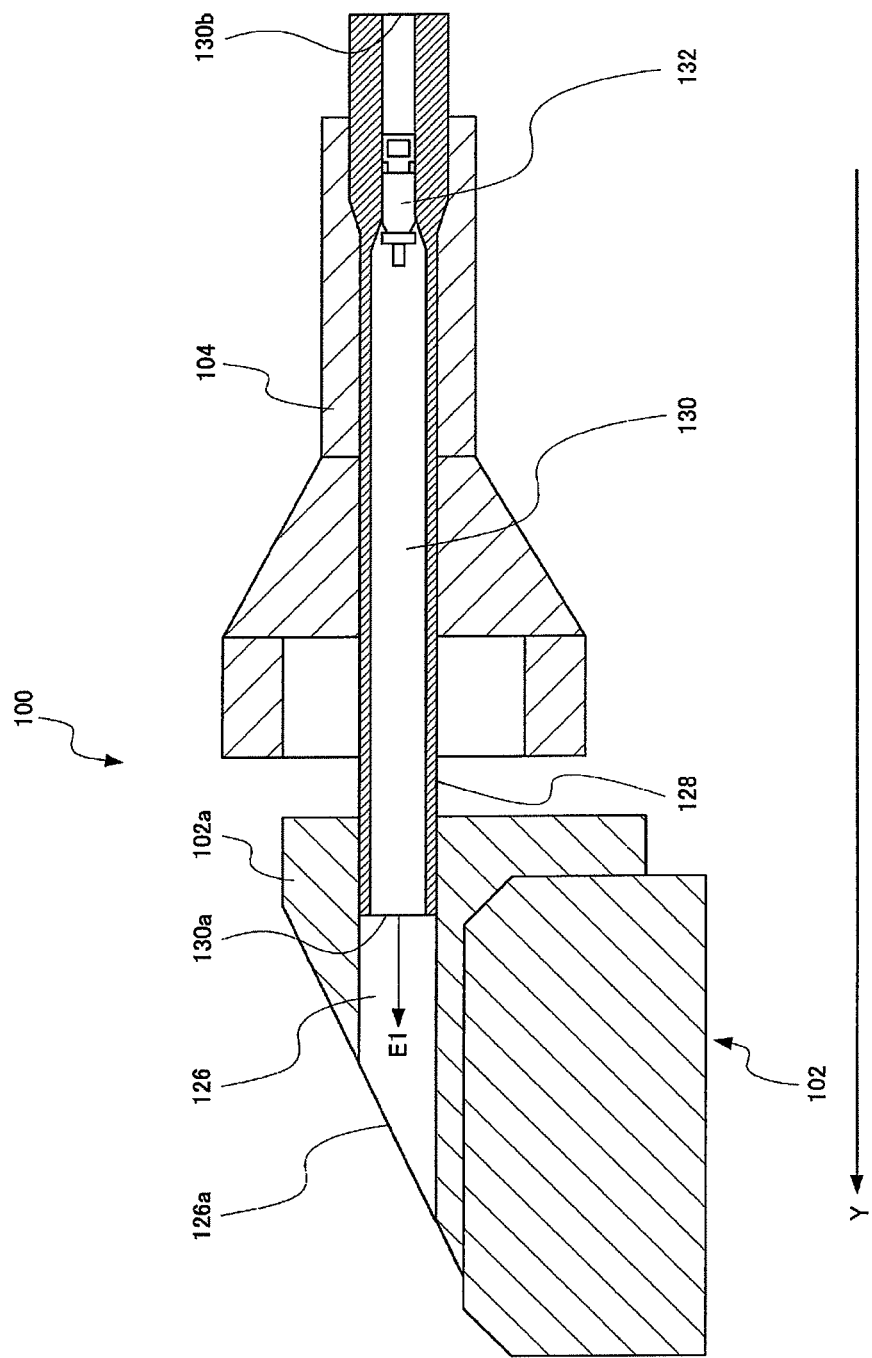
FIG. 5 is an arrow cross-sectional view of the obtaining device along line B-B in FIG. 3.

FIG. 5 is an arrow cross-sectional view of the obtaining device along line B-B in FIG. 3. As illustrated in FIG. 5, a communication hole 126 that allows communication between the tire valve 104 and the tire cavity region and that extends in the connection direction (Y-direction in FIG. 5) of the tire valve 104, is provided in the convex portion 102a of the housing 102. The communication hole 126 and the tire valve 104 are connected due to a distal end of the tire valve 104 being inserted into the communication hole 126. A cavity region side opening part 126a of the communication hole 126 is provided in the surface of the convex portion 102a at the end portion of the communication hole 126 on the tire cavity region side. A valve side opening part 126b (illustrated in FIGS. 7A and 7B) of the communication hole 126 is provided in the surface of the convex portion 102a at the end portion of the communication hole 126 on the tire valve 104 side. In this way, the opening of the tire valve 104 is connected to the communication hole 126.

Conversely, a tubular penetrating portion 128 that extends in the direction of extension (Y-direction in FIG. 5) of the tire valve 104 is provided in the tire valve 104, and a through-hole 130 that extends in the direction of extension of the tire valve 104 is formed inside the penetrating portion 128. A housing side opening part 130a of the through-hole 130 is provided in the end portion surface of the penetrating portion 128 on the tire cavity region side. In this case, the housing side opening part 130a of the tire valve 104 is connected to the communication hole 126. Moreover, an external opening part 130b of the through-hole 130 is provided in the end portion surface of the penetrating portion 128 on the tire 2 exterior portion side. Furthermore, a valve core 132 for opening and closing the through-hole 130 is provided in the through-hole 130 by a threaded attachment with the inner wall of the penetrating portion 128.

The communication hole 126 is formed to allow the penetrating portion 128 to be inserted from the valve side opening part 126b so that the housing side opening part 130a of the through-hole 130 is positioned inside the communication hole 126. Due to the insertion of the penetrating portion 128, the communication hole 126 allows communication between the housing side opening part 130a of the tire valve 104 and the tire cavity region. As illustrated in FIG. 5, the communication hole 126 is preferably formed so as to extend from the housing side opening part 130a at least in the direction of extension (E1 direction in FIG. 5) of the tire valve 104 in the housing side opening part 130a.

Figure 6:
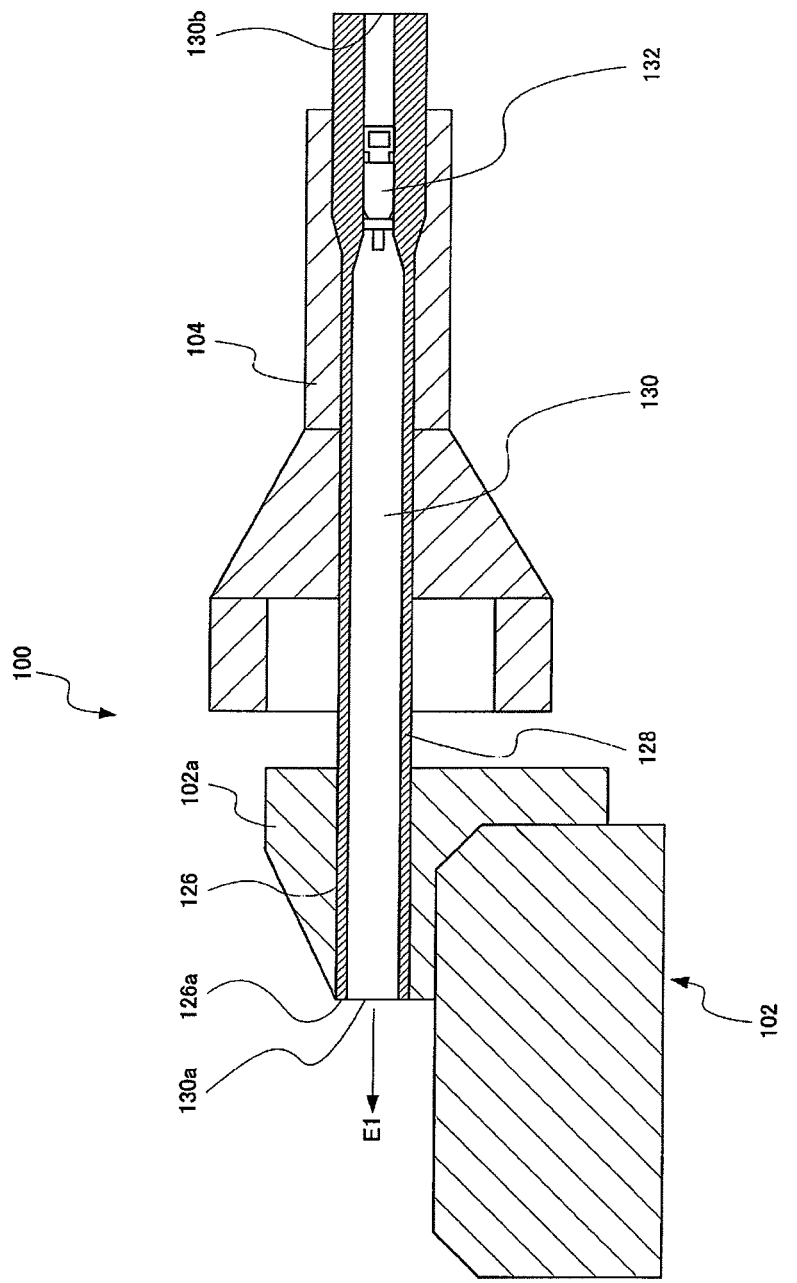
FIG. 6 is a cross-sectional view of another example of the obtaining device depicted in FIG. 5.

As illustrated in FIG. 6, the housing side opening part 130a of the through-hole 130 may be disposed in the same position as the cavity region side opening part 126a of the communication hole 126.

The diameter of the communication hole 126 may be formed in a uniform manner along the direction of extension of the communication hole 126, or may be formed so as to change along the direction of extension of the communication hole 126. The inner diameter of the tire valve 104, that is, the diameter of the through-hole 130, may be formed in a uniform manner along the direction of extension of the through-hole 130, or may be formed so as to change along the direction of extension of the through-hole 130. The diameter of the communication hole 126 and the inner diameter of the tire valve 104 have a minimum value of not less than 2.5 mm, preferably not less than 2.8 mm, or more preferably not less than 3.0 mm and not more than 5.0 mm. As described below, when recovering puncture repair liquid that has pooled inside the tire cavity region, a tube 20 (illustrated in FIG. 10) may be easily inserted into the tire cavity region through the through-hole 130 of the tire valve 104 and the communication hole 126 of the housing 102 by setting the minimum value of the diameter of the communication hole 126 and the inner diameter of the tire valve 104 as described above. As a result, puncture repair liquid may be recovered efficiently.

The hole cross-sectional area of the communication hole 126 is preferably formed to be greater than the hole cross-sectional area of the through-hole 130 of the tire valve 104 at a portion where the inner diameter of the tire valve 104 is the smallest (e.g., the portion where the valve core 132 touches the inner wall of the through-hole 130 as can be seen in FIG. 5). As a result, the hole cross-section of the communication hole 126 may be formed wider than the hole cross-section of the through-hole 130 at the portion where the inner diameter of the tire valve 104 is the smallest. Therefore, the tube 20 may be inserted easily into the tire cavity region through the through-hole 130 of the tire valve 104 and the communication hole 126 of the housing 102. As a result, puncture repair liquid may be recovered efficiently.

Figure 7A:
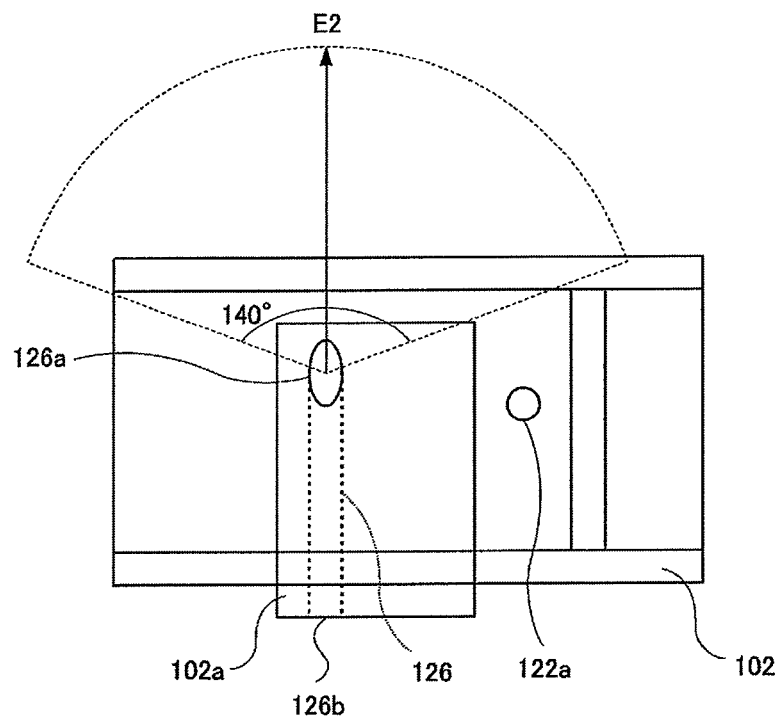
FIG. 7A and FIG. 7B describe the positional relationship between an opening part on a cavity region side of a communication hole and an outside opening part of a ventilation hole.
Figure 7B:
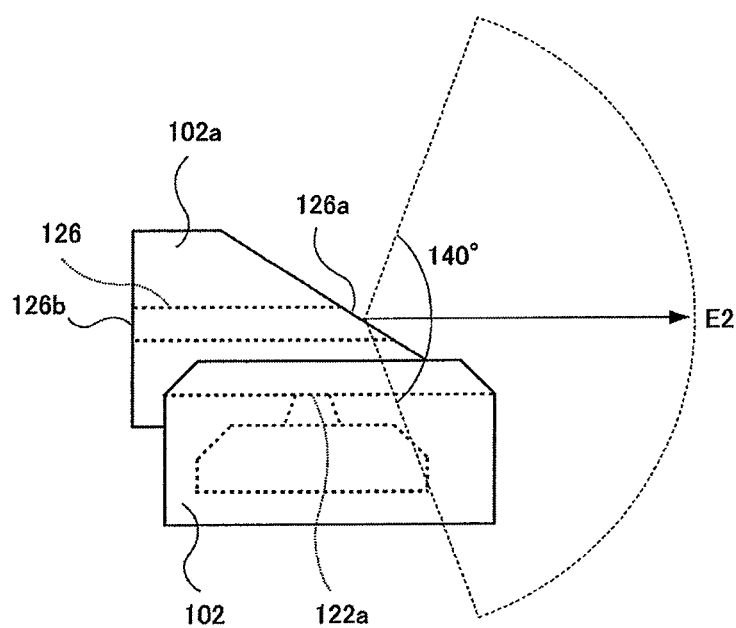

FIGS. 7A and 7B describe a positional relationship between the cavity region side opening part 126a of the communication hole 126 and the outside opening part 122a of the ventilation hole 122. FIG. 7A is a plan view of the housing 102 and FIG. 7B is a side view of the housing 102. As illustrated in FIGS. 7A and 7B, the outside opening part 122a of the ventilation hole 122 is provided at a position outside of a range of less than 140°, preferably less than 160°, and more preferably less than 180° of the angle of view from a center position corresponding to the position of the cavity region side opening part 126a with respect to a central direction aligned with the direction of extension (E2 direction in FIGS. 7A and 7B)) of the communication hole 126 at the cavity region side opening part 126a. That is, the position of the ventilation hole 122 is limited with respect to the direction of extension of the communication hole 126 at the cavity region side opening part 126a. Consequently, even if a liquid such as the puncture repair liquid flowing into the tire valve 104 flows out from the cavity region side opening part 126a into the tire cavity region and the liquid splatters widely from the cavity region side opening part 126a, the adhesion of the liquid on the ventilation hole 122 may be prevented. Therefore, even if a flat tire is fixed using the puncture repair liquid, tire information such as the tire air pressure information can be suitably obtained.

Figure 8:
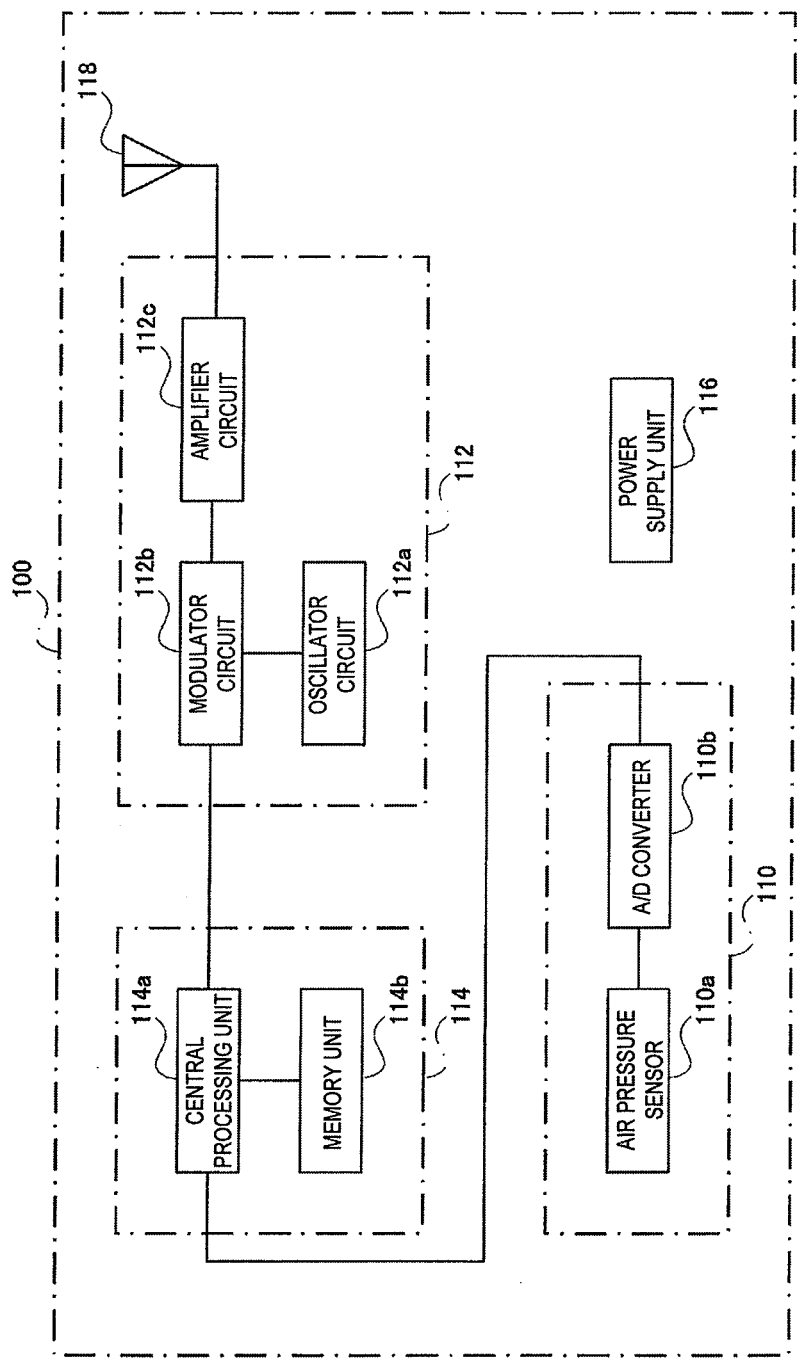
FIG. 8 is a circuit configuration of the obtaining device depicted in FIG. 1.

FIG. 8 is a circuit configuration of the obtaining device 100.

The sensor unit 110 has an air pressure sensor 110a and an A/D converter 110b. The air pressure sensor 110a senses the air pressure of the internal space 120 of the housing 102 and outputs the sensed pressure as a pressure signal. Since the internal space 120 communicates with the tire cavity region via the ventilation hole 122, the air pressure sensor 110a is able to sense the air pressure in the tire cavity region.

The A/D converter 110b converts the pressure signal output from the air pressure sensor 110a and outputs a pressure datum.

The processing unit 114 includes a central processing unit 114a and a memory unit 114b. The central processing unit 114a operates based on a program stored in semiconductor memory of the memory unit 114b. When the central processing unit 114a is powered and operated, the central processing unit 114a controls so as to transmit the pressure data received from the sensor unit 110 as the air pressure information to the monitoring device 200 via the transmitter 112 at a predetermined time interval such as every five minutes. Identifying information unique to each obtaining device 100 is previously stored in the memory unit 114b, and the central processing unit 114a controls so that the pressure data is transmitted to the monitoring device 200 along with the identifying information.

The memory unit 114b includes read-only memory (ROM) in which the program that operates the central processing unit 114a is stored and rewritable non-volatile memory such as, for example, electrically erasable programmable read-only memory (EEPROM) or the like. The identifying information unique to each obtaining device 100 is stored in a non-rewritable region of the memory unit 114b.

The transmitter 112 includes an oscillator circuit 12a, a modulator circuit 112b, and an amplifier circuit 112c.

The oscillator circuit 112a generates a carrier wave signal, for example, a radio frequency (RF) signal having a frequency in the 315 MHz band.

The modulator circuit 112b uses the pressure data transmitted from the central processing unit 114a and the identifying information unique to the obtaining device 100 to modulate the carrier wave signals and generate a transmission signal. Examples of a modulation method that can be used include amplitude shift keying (ASK), frequency modulation (FM), frequency shift keying (FSK), phase modulation (PM), phase shift keying (PSK), and the like.

The amplifier circuit 112c amplifies the transmission signal generated by the modulator circuit 112b. The amplified transmission signal is transmitted wirelessly through an antenna 118 to the monitoring device 200.

The power supply unit 116 uses a secondary battery, for example, to provide electrical power to the sensor unit 110, the transmitter 112, and the processing unit 114.

(Configuration of the Monitoring Device)

Figure 9:
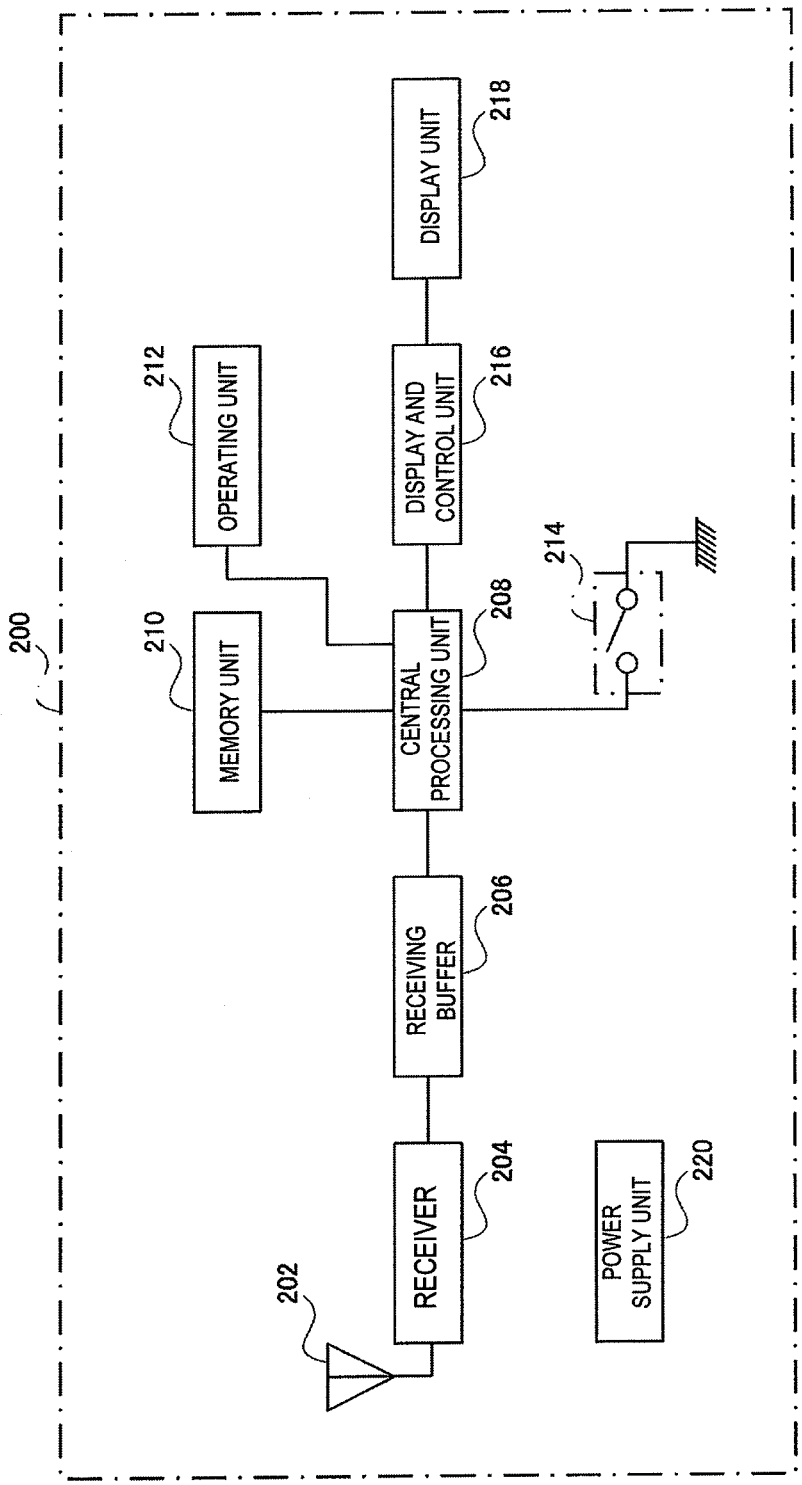
FIG. 9 is a circuit configuration of a monitoring device depicted in FIG. 1.

FIG. 9 is a circuit configuration of the monitoring device 200.

The monitoring device 200 is disposed, for example, at the location of the driver's seat in the vehicle 1 and reports air pressure information to the driver. The monitoring device 200 has an antenna 202, a receiver (reception device) 204, a receiving buffer 206, a central processing unit 208, a memory unit 210, an operating unit 212, a switch 214, a display controller 216, a display unit 218, and a power supply unit 220. A monitoring part that determines the presence or absence of a tire abnormality on the basis of the received tire information and then reports the determination result, is formed by the central processing unit 208, the memory unit 210, the operating unit 212, the switch 214, the display controller 216, and the display unit 218.

The antenna 202 is adjusted to a frequency that is the same as the transmission frequency of the obtaining device 100, and is connected to the receiver 204.

The receiver 204 receives the transmission signal at a certain frequency transmitted by the obtaining device 100, conducts demodulation, and extracts data including the pressure data and the identifying information. The data is outputted to the receiving buffer 206.

The receiving buffer 206 temporarily stores the pressure datum and the identifying information datum output from the receiver 204. The stored pressure datum and identifying information datum are output to the central processing unit 208 in accordance with a command from the central processing unit 208.

The central processing unit 208 is primarily constructed of a CPU and operates based on a program stored in the memory unit 210. The central processing unit 208 monitors the air pressure of the tires 2a to 2d for each instance of identifying information based on the received pressure datum and identifying information datum. Specifically, the central processing unit 108 determines the presence or absence of an abnormality of the tires 2a to 2d on the basis of the pressure data, and reports the determination results to the driver. "Determines the presence of abnormalities" means, for example, determining whether the tire has been punctured based on abnormally low air pressure or a sudden decline in air pressure over a short period of time.

The central processing unit 208 outputs the determination results to the display controller 216 and the determination results are displayed on the display unit 218 via the display controller 216.

Moreover, the central processing unit 208 initializes the communication protocol between itself and the obtaining device 100 in response to information from the operating unit 212 and information from the switch 214. The setting of a determination condition for determining the presence or absence of a tire abnormality by the central processing unit 208 may be conducted based on information from the operating unit 212.

The memory unit 210 includes ROM in which the program that operates the CPU of the central processing unit 208 is stored and non-volatile memory such as, for example, EEPROM or the like. A table of communication protocols for communicating with the obtaining device 100 is stored in the memory unit 210 in the manufacturing stage. The obtaining device 100 and the monitoring device 200 communicate in the initial stage with a preset communication protocol. Information such as communication protocols, transfer bit rates, data formats and the like is included in correspondence with the unique identifying information of each of the obtaining devices 100 in the communication protocol table. The information may be freely reset with an input from the operating unit 212.

The operating unit 212 includes an input device such as a keyboard, and is used for inputting various types of information and conditions. The switch 214 is used for instructing the central processing unit 208 to start initialization.

The display controller 216 controls the display unit 218 to display tire air pressure associated with the mounting position of the tires 2a to 2d in accordance with the determination result from the central processing unit 208. The display controller 216 controls the display unit 218 to display the determination result that indicates the tire puncture condition at the same time.

The power supply unit 220 supplies electrical power through a power source line, not illustrated, by controlling the electrical power supplied from a battery mounted in the vehicle 1 at a voltage suitable for each unit of the monitoring device 200.

The obtaining device 100 and the monitoring device 200 are configured in this way.

(Method for Recovering Puncture Repair Liquid)

Figure 10:
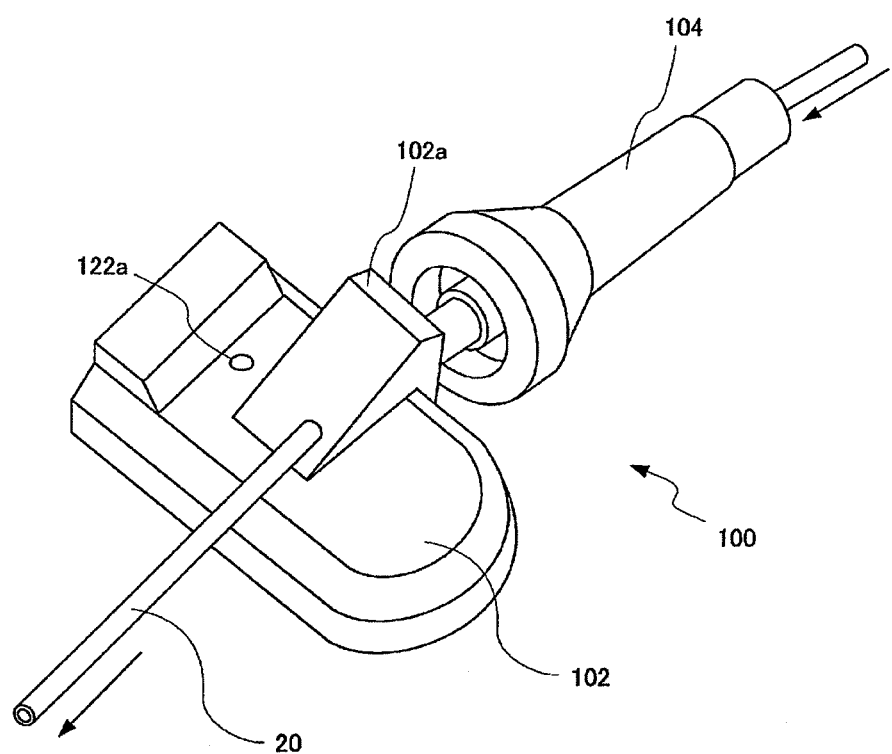
FIG. 10 describes a usage state of a tube used for recovering puncture repair liquid.

Next, a method for recovering puncture repair liquid in this embodiment will be described. FIG. 10 describes a usage state of a tube used for recovering puncture repair liquid.

In the method for recovering puncture repair liquid in this embodiment, the flexible tube 20 is used by being inserted into the tire cavity region from the through-hole 130 of the tire valve 104 through the communication hole 126 of the housing 102 as illustrated in FIG. 10. The tube 20 has a length that allows the tube 20 to at least reach the tire inner circumferential surface of the outermost portion in the tire radial direction when inserted into the tire cavity region from the external opening part 130b of the tire valve 104.

While the material of the tube 20 is not limited in particular, rubber such as silicone rubber, a synthetic resin such as polypropylene, polyethylene, polyurethane, polyamide, or fluororesin, or metal and the like may be used.

The outer diameter of the tube 20 is preferably within a range of 2.4 mm to 4.9 mm and is preferable formed to be smaller than the inner diameter of the tire valve 104. If the outer diameter of the tube 20 were to be greater than 4.9 mm, it would be difficult to pass the tube 20 through the through-hole 130 of the tire valve 104 and through the communication hole 126 of the housing 102. Conversely, if the outer diameter of the tube 20 were to be less than 2.4 mm, the time required for recovering the puncture repair liquid would be very long.

Figure 11:
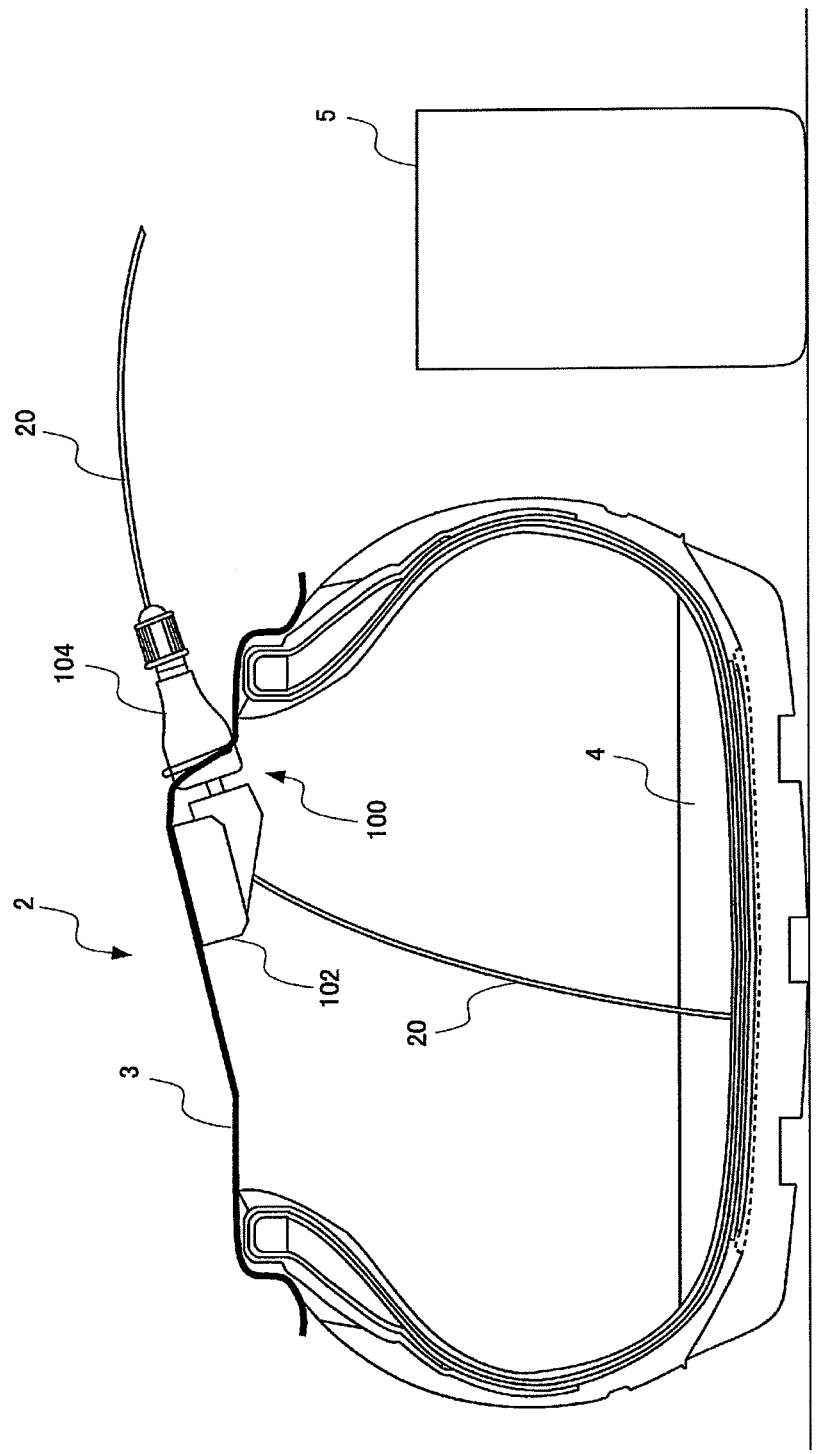
FIG. 11 describes a process for recovering puncture repair liquid.

FIG. 11 describes a process for recovering the puncture repair liquid.

First, a valve removal tool and the like is used to remove the valve core 132 from the tire valve 104 of the obtaining device 100 on the tire 2 in which the obtaining device 100 is provided inside the tire cavity region and in which puncture repair liquid 4 is injected into the tire cavity region. As a result, the tire cavity region communicates with the atmosphere outside of the tire 2. At this time, the air filling the tire cavity region is exhausted to the outside of the tire 2 through the communication hole 126 of the housing 102 and through the through-hole 130 of the tire valve 104 due to the air pressure inside the tire cavity region being higher than the air pressure outside of the tire.

Next, when the air in the tire cavity region is exhausted to the outside of the tire 2 through the communication hole 126 of the housing 102 and through the through-hole 130 of the tire valve 104, the tube 20 is inserted from the tire valve 104 so as to reach the puncture repair liquid 4 in the tire cavity region. In this case, the puncture repair liquid 4 is exhausted through the tube 20 to the outside of the tire 2 by forcing the puncture repair liquid 4 up into the tube 20 with the air pressure inside the tire cavity region.

The puncture repair liquid 4 exhausted to the outside of the tire 2 is then recovered in a container 5 that has a suitable capacity.

With the above recovery method, the tube 20 is necessarily inserted so as to reach the puncture repair liquid 4 inside the tire cavity region while the air filling the tire cavity region is exhausted to the outside of the tire 2.

In this embodiment, the tube 20 may be easily inserted into the tire cavity region through the through-hole 130 and through the communication hole 126 due to the restriction of the minimum value of the diameter of the communication hole 126. As a result, the tube 20 may easily reach the puncture repair liquid 4 while the air filling the tire cavity region is being exhausted to the outside of the tire 2. Therefore, the puncture repair liquid 4 may be easily recovered.

According to the obtaining device 20, the system 10, and the method for recovering puncture repair liquid of this embodiment as described above, tire information such as tire air pressure information and the like may be suitable obtained even if a puncture of the tire is repaired using the puncture repair liquid, and the puncture repair liquid may be easily recovered.

First Modified Example

Next, an example (first modified example) of the through-hole 130 that differs from the through-hole 130 illustrated in FIG. 5 will be described with reference to FIGS. 12 and 13.

Figure 12:
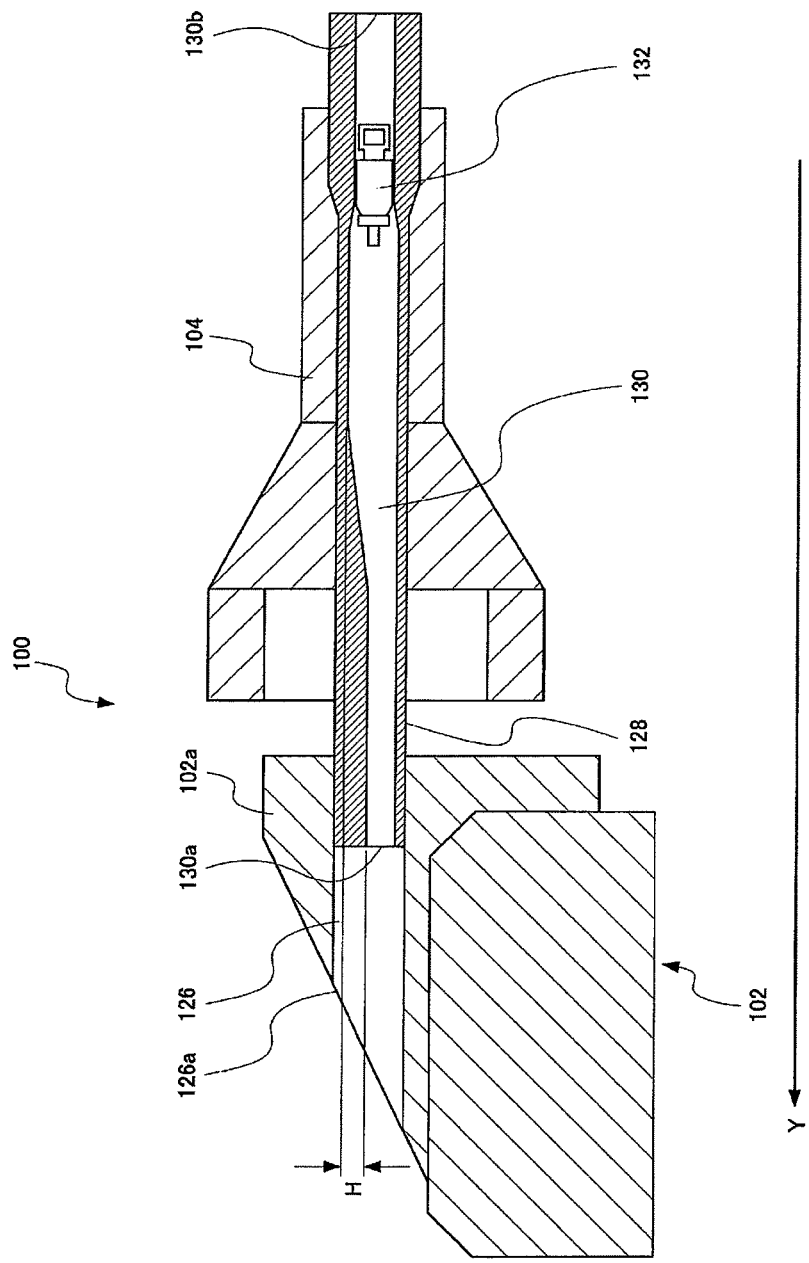
FIG. 12 describes another example of a through-hole depicted in FIG. 5.
Figure 13:
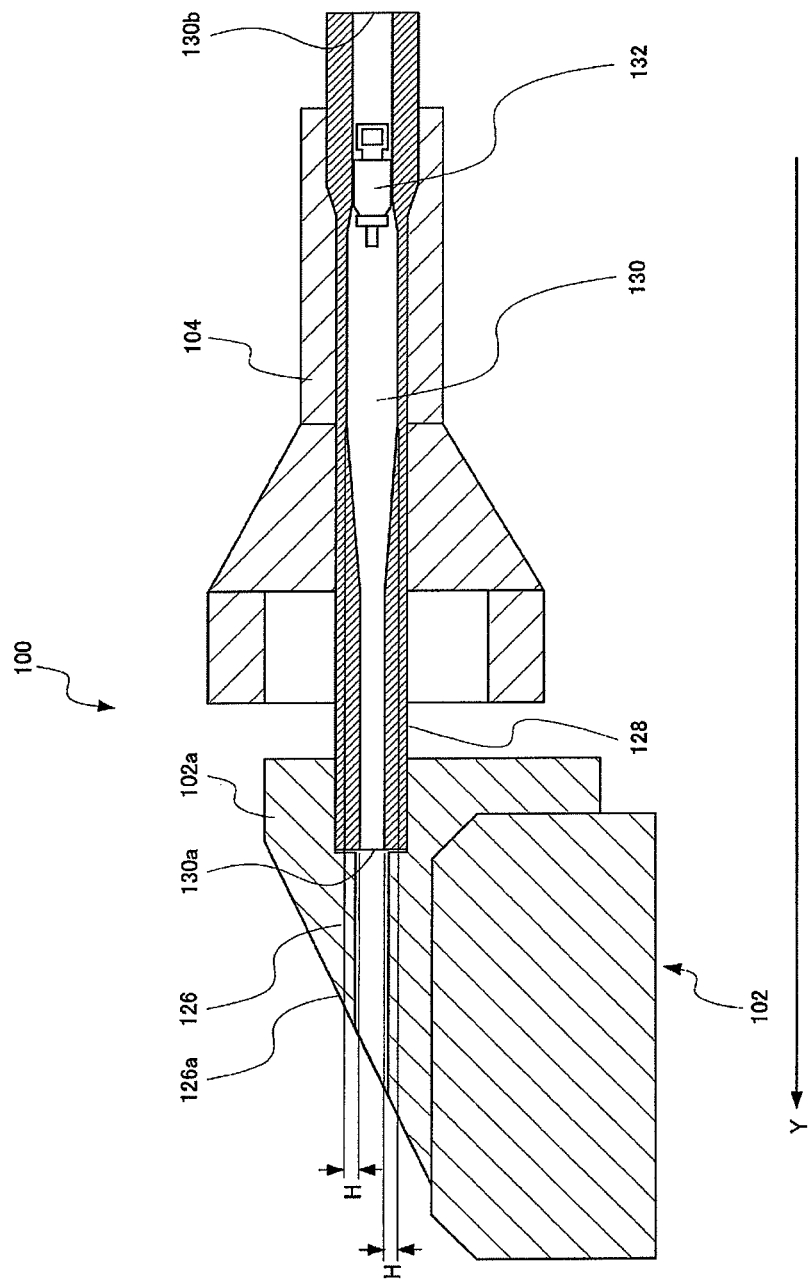
FIG. 13 describes another example of the through-hole depicted in FIG. 5.

As illustrated in FIGS. 12 and 13, a step that protrudes from the inner wall surface of the inner wall of the through-hole 130 and that extends in the communication direction of the through-hole 130, may be provided so that the hole cross-sectional area of the through-hole 130 of the tire valve 104 increases from the housing side opening part 130a toward the external opening part 130b. In this case, the height H of the step is preferably 1 mm or less. As illustrated in FIG. 12, when the step is formed so that the hole cross-sectional area of the through-hole 130 of the tire valve 104 gradually increases from the housing side opening part 130a toward the external opening part 130b, the tube 20 inserted into the through-hole 130 may be preferably guided along the surface of the step to the housing side opening part 130a. In this way, the ability to insert the tube 20 to the tire cavity region may be improved.

As illustrated in FIG. 12, the step may be provided on a portion of the periphery of the inner wall of the through-hole 130, or may be provided over the entire surface of the periphery of the inner wall of the through-hole 130 as illustrated in FIG. 13. Moreover, as illustrated in FIG. 13, a step that has a height not more than the height H of the step in the through-hole 130 and that is formed so as to extend in the communication direction of the communication hole 126, may be formed in the communication hole 126.

Second Modified Example

Figure 14B:
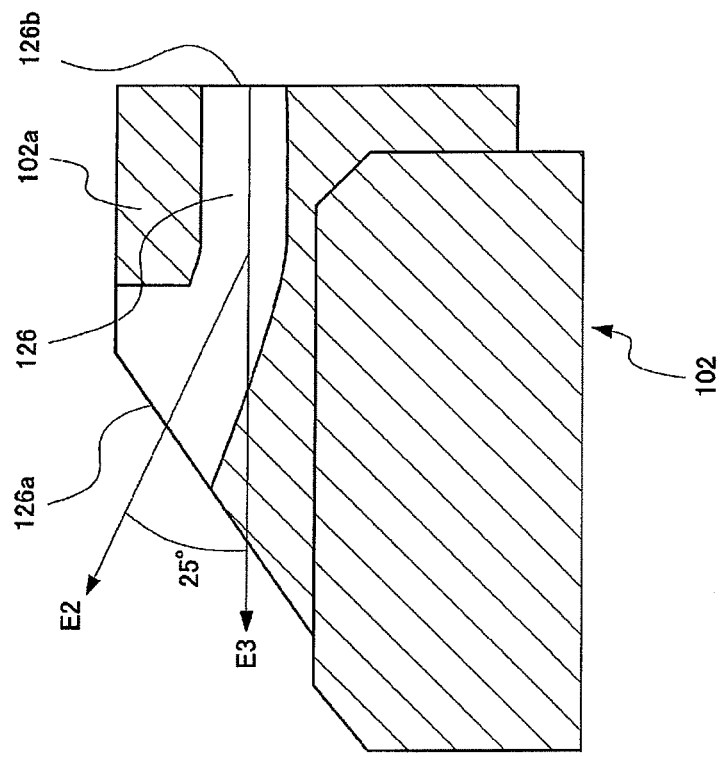
FIGS. 14A and 14B describe other examples of the ventilation hole depicted in FIG. 5.
Figure 14A:
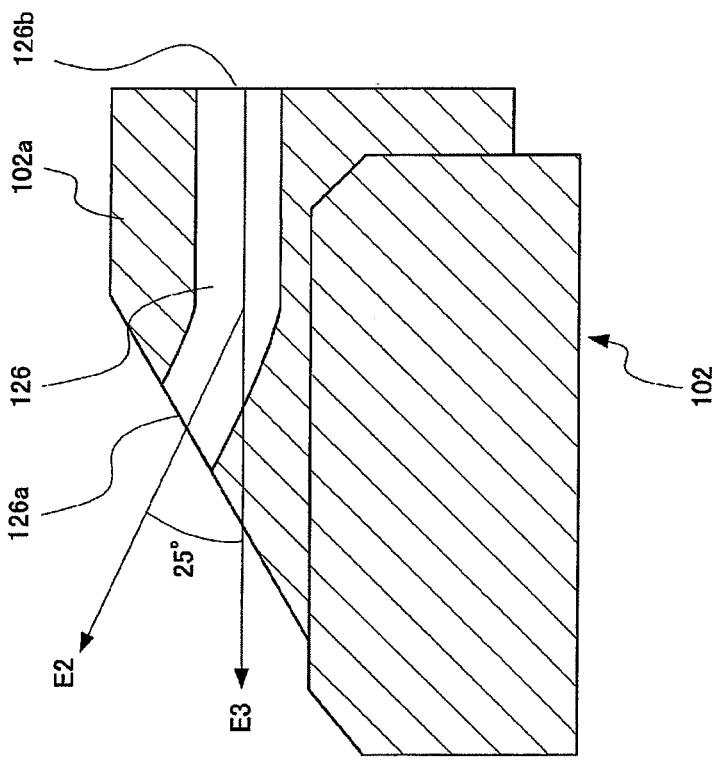

FIGS. 14A and 14B describe an example (second modified example) of the communication hole 126 that differs from the communication hole 126 illustrated in FIG. 5. The cross-sectional shape of the communication hole 126 illustrated in FIGS. 14A and 14B differs from that of the communication hole 126 illustrated in FIG. 5.

As illustrated in FIGS. 14A and 14B, the direction of extension (E2 direction in FIGS. 14A and 14B) of the communication hole 126 at the cavity region side opening part 126a of the communication hole 126 may be formed to face the outer side in the tire radial direction. In this case, the tube 20 inserted into the tire valve 104 is guided through the through-hole 130 and the communication hole 126 from the cavity region side opening part 126a toward the outer side in the tire radial direction. As a result, the puncture repair liquid 4 pooled on the outer side in the tire radial direction in the tire cavity region may be easily recovered since the tube 20 is easily able to reach the outer side in the tire radial direction in the tire cavity region.

Moreover, the angle formed by the direction of extension (E2 direction in FIGS. 14A and 14B) of the communication hole 126 at the cavity region side opening part 126a of the communication hole 126 and the direction of extension (E3 direction in FIGS. 14A and 14B) of the communication hole 126 at the valve side opening part 126b of the communication hole 126, is preferably not less than 0° and not more than 25°. Due to the above configuration, the ability to insert the tube 20 to the tire cavity region may be improved.

As illustrated in FIG. 14B, the cavity region side opening part 126a side of the communication hole 126 may be formed in a groove shape.

Third Modified Example

Figure 15:
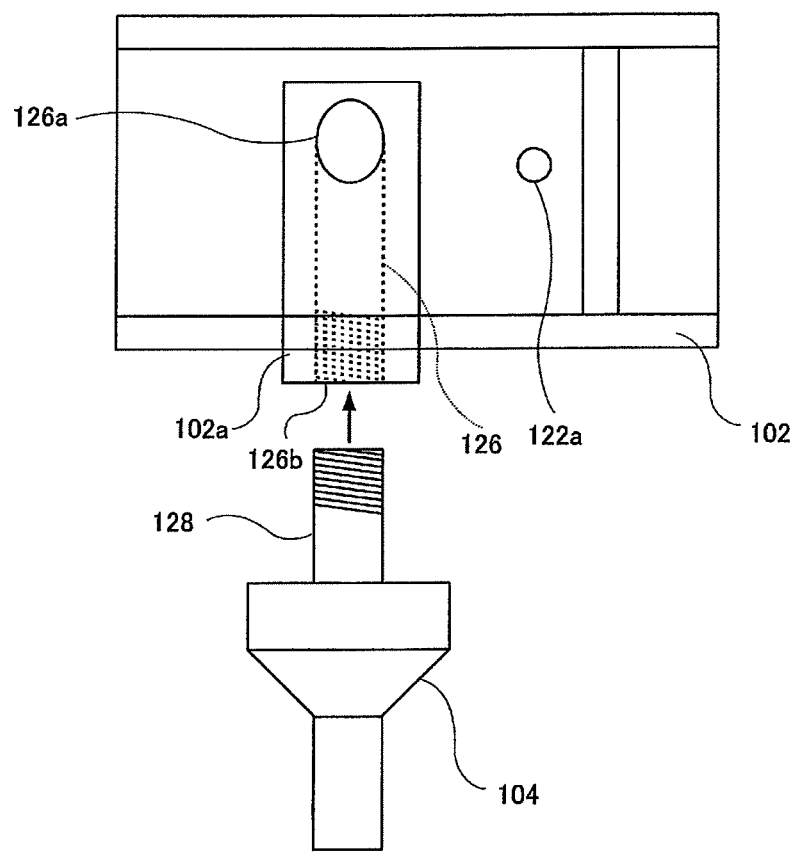
FIG. 15 describes an example of a method for attaching a tire valve to a housing.

FIGS. 15 to 17 describe an example (third modified example) of another obtaining device 100 that differs from the above embodiment. The feature for which the obtaining device 100 illustrated in FIGS. 15 to 17 differs from the obtaining device 100 of the above embodiment involves the feature of a detachable mechanism, in the housing 102, in which a penetrating portion 128 of the tire valve 104 is inserted into the communication hole 126 and held in a removable manner.

By forming the housing 102 and the tire valve 104 in a removable manner, only the tire valve 104 may be removed and replaced with a new tire valve even when, for example, the puncture repair liquid 4 adheres to the tire valve 104 when repairing a puncture.

FIG. 15 describes an example of the third modified example. A male thread is formed on the outer circumferential surface of the penetrating portion 128 illustrated in FIG. 15, and a female thread is formed on the inner wall on the valve side opening part 126b side of the communication hole 126. The female thread formed on the communication hole 126 is an example of a detachable mechanism. The tire valve 104 is attached to or detached from the housing 102 by the male thread of the penetrating portion 128 being screwed together with the female thread of the communication hole 126 or by separating the two threads.

Figure 16A:
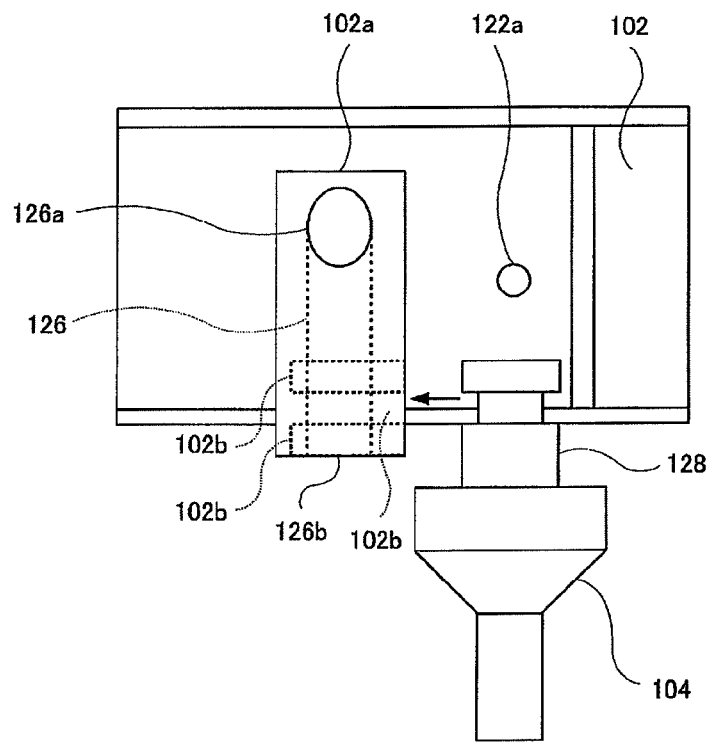
FIGS. 16A and 16B describe other examples of methods for attaching the tire valve to the housing.
Figure 16B:
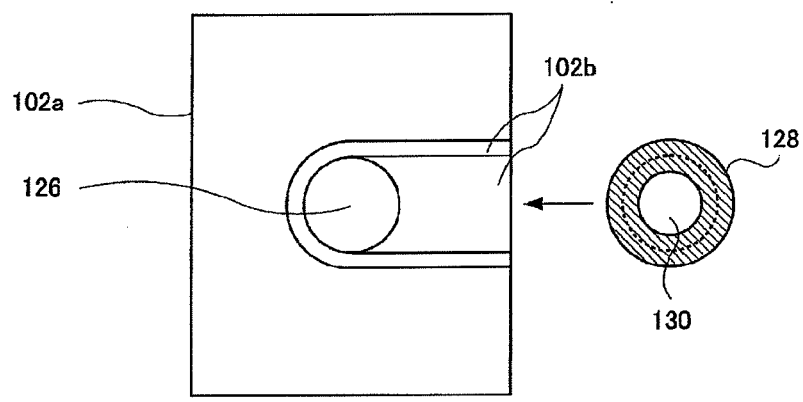

FIGS. 16A and 16B describe another example that differs from the one illustrated in FIG. 15. FIG. 16A is a plan view of the housing 102 and FIG. 16B is a view when looking at the valve side opening part 126b of the communication hole 126 from the outside of the housing 102. As illustrated in FIGS. 16A and 16B, a groove 102b to allow the insertion of the penetrating portion 128 from the side surface of the communication hole 126 is formed in the convex portion 102a of the housing 102. The groove 102b is an example of the detachable mechanism. The tire valve 104 is attached to the housing 102 by aligning and engaging the penetrating portion 128 inserted into the groove 102b with the position of the hole of the communication hole 126.

FIGS. 17A to 17C describe another example that differs from the examples illustrated in FIGS. 15 and 16. As illustrated in FIG. 17A, a locking member 102c formed so as to elastically deform in the direction orthogonal to the direction of extension of the communication hole 126 and so as to extend in the direction of extension of the communication hole 126, is provided on the side surface of the convex portion 102a of the housing. The locking member 102c is an example of the detachable mechanism. A locking protrusion that protrudes from the inner wall of the communication hole 126 toward the central axis of the communication hole 126 is provided on the locking member 102c. As illustrated in FIG. 17B, when the penetrating portion 128 is inserted into the communication hole 126, the locking member 102c deforms elastically toward the outer side in the radial direction of the communication hole 126 while the locking protrusion is touching the penetrating portion 128. As illustrated in FIG. 17C, the penetrating portion 128 is then inserted further and when the locking protrusion touches a recessed portion provided in the penetrating portion 128, the elastic deformation of the locking member 102c is restored. At this time, the penetrating portion 128 is locked in the direction of extension of the communication hole 126 by the locking protrusion. In this way, the tire valve 104 is attached to the housing 102.

EXAMPLES

Various obtaining devices were fabricated in order to study the effects of the obtaining device, the tire condition monitoring system, and the method for recovering puncture repair liquid of the present technology. The fabricated obtaining devices were installed inside tire cavity regions and whether or not puncture repair liquid adhered to the surface of the ventilation holes was examined after the puncture repair liquid was injected through the through-holes of the tire valves.

The diameter of the communication hole 126 in the fabricated obtaining devices and the inner diameter of the tire valve had a minimum value of 2.5 mm.

The following table 1 shows whether or not the puncture repair liquid adhered to the surface of the ventilation hole for Comparative Examples 1 and 2 and for Working Examples 1 to 3.

The comparative examples are obtaining devices in which the ventilation hole 122 is provided in a position within a range of less than 140° of the angle of view from a center position corresponding to the position of the cavity region side opening part 126a of the communication hole 126 with respect to a central direction aligned with the direction of extension of the communication hole 126 from the cavity region side opening part 126a of the communication hole 126. In the Working Examples 1 to 3, the angle of view is changed within a range of 140° to 180°.

TABLE 1

|  | Comparative Example 1 | Comparative Example 2 | Working Example 1 | Working Example 2 | Working Example 3 |
|---|---|---|---|---|---|
| Angle of view (°) with respect to the position of the ventilation hole with respect to a central direction aligned with the direction of extension of the communication hole | 0 | 130 | 140 | 150 | 180 |
| Presence or absence of puncture repair liquid adhesion on surface of ventilation hole | Present | Present | Absent | Absent | Absent |

It can be seen, when comparing Comparative Examples 1 and 2 and Working Examples 1 to 3, that the puncture repair liquid does not adhere to the surface of the ventilation hole 122 due to the ventilation hole 122 being provided in a position outside of the range in which the angle of view is less than 140°.

Accordingly, the obtaining device, the tire condition monitoring system, and the method for recovering puncture repair liquid of this embodiment are clearly effective.

While the obtaining device, the tire condition monitoring system, and the method for recovering puncture repair liquid of the present technology have been described in detail up to this point, the obtaining device, the tire condition monitoring system, and the method for recovering puncture repair liquid of the present technology are not limited to the above embodiments and it is apparent that a variety of changes and modifications can be made without departing from the scope of the present technology.

The invention claimed is:

1. A tire information device provided in a tire cavity region for obtaining tire information related to a condition of a tire, the tire information device comprising:
a sensor that detects a condition of gas filling the tire cavity region as tire information;
a tire valve that ventilates the tire cavity region with the atmosphere outside of the tire; and
a housing that includes:
an internal space for containing the sensor in a state of being compartmentalized from the tire cavity region,
a ventilation hole that allows communication between the internal space and the tire cavity region, and
a communication hole that is connected with an opening part at an end portion on the tire cavity region side of the tire valve and that allows communication between the opening part of the tire valve and the tire cavity region,
the diameter of the communication hole and the inner diameter of the tire valve having a minimum value of not less than 2.5 mm, and
the ventilation hole being provided at a position outside a range of less than 140° of the angle of view from a center position corresponding to the position of an opening of the communication hole with respect to a central direction aligned with the direction of extension of the communication hole from the opening of the communication hole at the end portion on the tire cavity region side.

2. The tire information device according to claim 1, wherein the hole cross-sectional area of the communication hole is greater than the hole cross-sectional area of the valve in a portion in which the inner diameter of the tire valve is the smallest.

3. The tire information device according to claim 1, wherein a step protrudes from the inner wall surface of an inner wall of the valve so that the hole cross-sectional area of the tire valve increases from the opening part toward an external opening part at an end portion of the tire valve on the tire exterior portion side, and the height of the step is 1 mm or less.

4. The tire information device according to claim 1, wherein the direction of extension of the communication hole faces the outer side in the tire radial direction at the opening of the end portion of the communication hole on the tire cavity region side, and the angle formed by the directions of extension of the communication hole at the openings at both end portions of the communication hole is 25° or less.

5. The tire information device according to claim 1, wherein a detachable mechanism that allows the tire valve to be inserted into the communication hole and to be held in a removable manner, is provided in the housing.

6. A tire condition monitoring system comprising:
a tire information device, the tire information device including:
a sensor that detects a condition of gas filling a tire cavity region as tire information;
a transmitter that wirelessly transmits the tire information detected by the sensor;
a tire valve that ventilates the tire cavity region with the atmosphere outside of the tire; and
a housing that includes:

an internal space for containing the sensor in a state of being compartmentalized from the tire cavity region, a ventilation hole that allows communication between the internal space and the tire cavity region, and a communication hole that is connected with an opening part at an end portion on the tire cavity region side of the valve and that allows communication between the opening part of the valve and the tire cavity region, the diameter of the communication hole and the inner diameter of the valve having a minimum value of not less than 2.5 mm, and the ventilation hole being provided at a position outside a range of less than 140° of the angle of view from a center position corresponding to the position of the opening of the communication hole with respect to a central direction aligned with the direction of extension of the communication hole from the opening of the communication hole at the end portion on the tire cavity region side;

a reception device, the reception device receiving the tire information transmitted by the transmitter of the tire information device; and a monitoring part, the monitoring part determining the presence or absence of an abnormality of the tire on the basis of the tire information received by the reception device, and reporting the determination results.

7. A method for recovering puncture repair liquid from a tire in which a tire information device for obtaining tire information related to a condition of a tire is provided in a tire cavity region and in which puncture repair liquid is injected into the tire cavity region, the method comprising the steps of:

removing a valve core of a tire valve of the tire information device, from the tire in which the tire information device is provided and in which puncture repair liquid is injected into the tire cavity region; and inserting a tube through the tire valve of the tire information device to reach the puncture repair liquid in the tire cavity region when air in the tire cavity region is exhausted to the outside of the tire through the tire valve, the tire information device including:

a sensor that detects a condition of gas filling the tire cavity region as tire information;

a tire valve that ventilates the tire cavity region with the atmosphere outside of the tire; and a housing that includes:

an internal space for containing the sensor in a state of being compartmentalized from the tire cavity region, a ventilation hole that allows communication between the internal space and the tire cavity region, and a communication hole that is connected with an opening part at an end portion on the tire cavity region side of the tire valve and that allows communication between the opening part of the tire valve and the tire cavity region, the diameter of the communication hole and the inner diameter of the tire valve having a minimum value of not less than 2.5 mm, and the ventilation hole being provided at a position outside a range of less than 140° of the angle of view from a center position corresponding to the position of the opening of the communication hole with respect to a central direction aligned with the direction of extension of the communication hole from the opening of the communication hole at the end portion on the tire cavity region side.

8. The system of claim 6, wherein an opening area of an inside opening part of the ventilation hole is at least four times greater than an opening area of an outside opening part of the ventilation hole.

9. The system of claim 6, wherein the communication hole is formed to extend in a direction in which the tire valve extends in the housing.

10. The system of claim 6, wherein a diameter of the communication hole and an inner diameter of the tire valve have a dimension of not less than 3.0 mm and not more than 5.0 mm.

11. The system of claim 6, wherein the ventilation hole is provided at a position outside a range of less than 160° of the angle of view from a center position corresponding to the position of the opening of the communication hole with respect to a central direction aligned with the direction of extension of the communication hole from the opening of the communication hole at the end portion on the tire cavity region side.

12. The system of claim 6, wherein the ventilation hole is provided at a position outside a range of less than 180° of the angle of view from a center position corresponding to the position of the opening of the communication hole with respect to a central direction aligned with the direction of extension of the communication hole from the opening of the communication hole at the end portion on the tire cavity region side.

13. The system of claim 6, wherein an angle formed by the communication hole between an inner opening part of the communication hole and a valve side opening part of the communication hole is not less than 0° and not more than 25°.

14. The system of claim 6, wherein the hole cross-sectional area of the communication hole is greater than the hole cross-sectional area of the valve in a portion in which the inner diameter of the tire valve is the smallest.

15. The system of claim 6, wherein a step protrudes from the inner wall surface of an inner wall of the valve so that the hole cross-sectional area of the tire valve increases from the opening part toward an external opening part at an end portion of the tire valve on the tire exterior portion side, and the height of the step is 1 mm or less.

16. The system of claim 6, wherein the direction of extension of the communication hole faces the outer side in the tire radial direction at the opening of the end portion of the communication hole on the tire cavity region side, and the angle formed by the directions of extension of the communication hole at the openings at both end portions of the communication hole is 25° or less.

17. The system of claim 6, wherein a detachable mechanism that allows the tire valve to be inserted into the communication hole and to be held in a removable manner, is provided in the housing.

18. The tire information device according to claim 1, wherein the tire valve extends in the tire width direction, and the communication hole bends so that the direction of extension of the communication hole at the opening of the end portion thereof on the tire cavity region side faces the outer side in the tire radial direction.

19. The tire information device according to claim 1, wherein the valve has an inclined surface on an inner wall of the valve so that the hole cross-sectional area of the tire valve gradually increases from the opening part toward an external opening part at an end portion of the tire valve on the tire exterior portion side.

* * * * *